United States Patent [19]
Gibson et al.

[11] Patent Number: 5,103,310
[45] Date of Patent: Apr. 7, 1992

[54] INTERFERENCE REDUCTION FOR EXTRA-SPECTRUM, COMPATIBLE TELEVISION SYSTEM

[75] Inventors: James J. Gibson; Theodor M. Wagner, both of Princeton; Frank B. Lang, Princeton Junction, all of N.J.

[73] Assignee: General Electric Company, Princeton, N.J.

[21] Appl. No.: 555,216

[22] Filed: Jul. 20, 1990

[51] Int. Cl.$^5$ ............................................. H04N 7/00
[52] U.S. Cl. ..................................... 358/141; 358/142
[58] Field of Search ................................ 358/141, 142

[56] References Cited

U.S. PATENT DOCUMENTS

| | | | |
|---|---|---|---|
| 4,237,486 | 12/1980 | Shimp | 358/142 |
| 4,910,798 | 3/1990 | Boardman | 455/295 |

OTHER PUBLICATIONS

"An Extended Definition Television System using Quadrature Modulation of the Video Carrier with Inverse Nyquist Filter", by Yoshio Yasumoto et al., IEEE Transactions on Consumer Electronics, vol. CE-33, No. 3, Aug. 1987, pp. 173-180.

"An NTSC Compatible Wide Screen Television System with Evolutionary Extendibility", S. Kageyama et al., IEEE Transactions on Consumer Electronics, vol. 34, No. 3, Aug. 1988, pp. 460-467.

Primary Examiner—John W. Shepperd
Attorney, Agent, or Firm—Joseph S. Tripoli; Eric P. Herrmann; Ronald H. Kurdyla

[57] ABSTRACT

The present invention is directed to an improved solution to the problem of interference in the picture displayed by a standard NTSC receiver that results from a received television signal that includes a quadrature-amplitude modulated additional-information constituent passing through the Nyquist filter of the standard receiver (this additional-informaton constituent being intended for use only by wide-screen and/or extended-definition television receivers). This solution, in accordance with each of several different embodiments, employs means at the transmitter that includes frequency-dependent attenuation means operating at baseband frequencies to modify the relative amplitudes of each frequency component of the lower and upper sidebands of the transmitted television signal that defines the additional-information constituent in a manner to compensate for the attenuation characteristics of the Nyquist filter of a standard NTSC receiver.

17 Claims, 6 Drawing Sheets

IDEALIZED NYQUIST FILTER
PASSBAND CHARACTERISTIC

IDEALIZED ATTENUATION FACTOR k
VS.
BASEBAND FREQUENCY f CHARACTERISTIC

INTERFERENCE REDUCTION FOR EXTRA-SPECTRUM, COMPATIBLE TELEVISION SYSTEM

BACKGROUND OF THE INVENTION

This invention relates to an improved technique for adding an additional-information constituent to a transmitted NTSC television signal in a manner such that the additional information defined by this constituent may be recovered by, for example, a wide screen and/or extended-definition receiver without introducing any noticeable interference in the picture displayed by a standard NTSC receiver. The invention will be described in terms of adding higher frequency components of a video signal to a broadcast television signal, but it should be appreciated that it is applicable to adding practically any type of signal, e.g. enhanced sound signals, to the broadcast signal.

As is known, the video bandwidth of an NTSC television signal includes an upper sideband that extends to 4.2 MHz above the picture carrier frequency (with the sound carrier frequency being situated 4.5 MHz above the picture carrier frequency) and a vestigial lower sideband that extends only 1.25 MHz below the picture carrier frequency. Further, a standard NTSC receiver includes a so-called Nyquist filter that nominally passes 0% of that portion of the received television signal more than 0.75 MHz below the picture carrier frequency and 100% of that portion of the received television signal more than 0.75 MHz above the picture carrier frequency. In the frequency interval from 0.75 MHz below to 0.75 MHz above the picture carrier frequency, the nominal percentage of the received television signal that is passed rises linearly with respect to frequency, so that the percentage of the received television signal passed at the carrier frequency itself is 50%.

Quadrature amplitude modulation (QAM) is a known technique for adding the aforesaid additional-information constituent to a transmitted NTSC television signal without increasing the bandwidth of the signal. The problem with QAM is that the presence of the Nyquist filter in a standard NTSC television receiver has the effect of rendering the respective upper and lower sideband amplitudes of the QAM unequal, which results in interference being introduced into the picture displayed thereby. In this regard, reference is made to both the article "An Extended Definition Television System Using Quadrature Modulation of the Video Carrier with Inverse Nyquist Filter," Yasumoto et al., IEEE Transactions on Consumer Electronics, pp 173–180, (1987), and the article "An NTSC Compatible Wide Screen Television System with Evolutionary Extendibility," Kageyama et al., IEEE Transactions on Consumer Electronics, pp 460–468, (1988). These articles not only discuss in some detail this problem of interference introduced into the picture displayed in a standard NTSC television receiver by QAM, but suggest a solution therefor. The suggested solution involves passing the additional-information constituent, after it has double-sideband amplitude-modulated an IF or RF carrier which is in quadrature with the main picture carrier, through a filter which has an "inverse transfer function" with respect to the Nyquist filter employed by a standard NTSC television receiver, before the QAM signal is transmitted in combination with a regular NTSC television signal. It is understood that the Nyquist slope does not necessarily have to be straight as shown in FIG. 1, but must be conjugate and anti-symmetric around the carrier frequency to operate properly as a vestigial sideband filter in a TV receiver. If a transfer function is defined by a complex function $H(fc+f)$ where fc is the carrier frequency and f is the frequency departure from the carrier frequency, then the inverse transfer function is defined here as a complex function $H^*(fc-f)$, i.e. the complex conjugate of $H(fc+f)$ mirrored around the carrier frequency fc. The dashed line shown in FIG. 1 illustrates the amplitude response of the inverse Nyquist filter. The net transfer function for QAM is thus $H(fc+f)H^*(fc-f)$ which is conjugate symmetric around fc. As a consequence there is no crosstalk of QAM into NTSC with the result that at the output of the Nyquist filter of a standard NTSC television receiver, the in-phase component of the lower sideband of the QAM signal ideally is equal in amplitude but of opposite phase with respect to the in-phase component of the upper sideband of the QAM signal. Therefore, the respective in-phase components of the lower and upper sidebands of the QAM signal cancel one another in the detected NTSC video signal. Since the regular NTSC television signal modulates an in-phase carrier and the video detector of a standard NTSC television detects the in-phase modulation but responds very little, if at all, to quadrature modulation, interference in the detected video signal by the QAM signal due to the presence of the Nyquist filter of the receiver is eliminated, or at least substantially reduced, by employing an inverse Nyquist filter in the transmitter.

Because an inverse Nyquist filter, which functions as an attenuation equalizer, inherently has to have a different effect on the lower and upper sidebands of the QAM signal, it must operate at IF or RF frequencies. Such a filter is more costly and less stable than attenuation equalizers designed to operate at baseband-frequencies. Further, in practice, such a filter is likely to require an additional frequency dependent delay correction in the RF domain in order to cancel the interference throughout the entire band of frequencies of the additional-information constituent.

SUMMARY OF THE INVENTION

The present invention is directed to an improved solution to the above-described interference problem which employs a frequency-dependent attenuation means that operates at baseband frequencies, rather than at IF or RF frequencies.

A first baseband signal modulates an in-phase carrier and a second baseband signal modulates a quadrature-phase carrier of the same carrier frequency. The second baseband signal is applied to compensating circuitry having a predetermined frequency-dependent attenuating characteristic for generating a compensating signal and modulating said in-phase carrier. The in-phase carrier modulated with the first baseband signal plus the compensating signal and the quadrature-phase carrier modulated with the second baseband signal are linearly combined for transmission.

DESCRIPTION OF THE PREFERRED EMBODIMENTS

Figure 1:
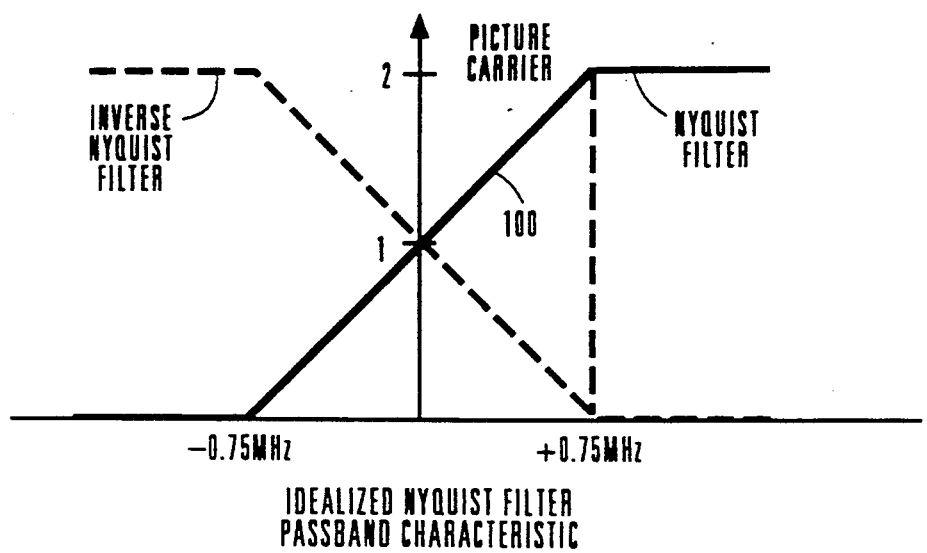
FIG. 1 graphically represents an idealized Nyquist filter passband of a standard NTSC receiver, and a corresponding inverse Nyquist filter passband.

As is known, a standard NTSC television receiver includes a Nyquist filter. The Nyquist filter shapes the portion of the bandwidth of the received RF television signal in the vicinity of its picture carrier prior to the video signal being demodulated by the video detector of the receiver. FIG. 1 shows an idealized passband of a Nyquist filter with respect to the picture carrier. As indicated in FIG. 1, the Nyquist filter in response to an applied video signal (1) entirely rejects all lower sideband frequencies of the applied video signal more than 0.75 MHz below the picture carrier frequency, (2) passes without any attenuation all upper sideband frequencies of the applied video signal more than 0.75 MHz above the picture carrier frequency, and (3) exhibits a positively-sloping linear transfer function for those applied video-signal frequencies between −0.75 MHz and +0.75 MHz with respect to the picture carrier frequency.

If, at the output of the Nyquist filter, the received video signal includes a quadrature-modulated constituent comprised of equal-amplitude lower and upper sidebands occupying the frequency interval between −0.75 MHz and +0.75 MHz with respect to the picture carrier frequency, the QAM constituent will make no contribution to the demodulated output of a synchronous video detector and only a very small contribution to the demodulated output of an envelope video detector. The reason for this is that the in-phase components of each pair of corresponding lower and upper sideband frequencies will be equal in amplitude but opposite in phase. Therefore, when demodulated, they will substantially cancel one another and not introduce noticeable interference in the picture displayed by the standard NTSC television receiver.

It is clear that if the in-phase components of each pair of corresponding lower and upper sideband frequencies of the added constituent are to be equal in amplitude at the output of the Nyquist filter, they must be transmitted to a standard NTSC television receiver and forwarded to the input of the Nyquist filter thereof with certain relative unequal amplitudes that compensate for the different attenuation they undergo in passing through the Nyquist filter.

As indicated, the Nyquist filter passband characteristic 100 shown in FIG. 1 is idealized. The passband characteristic of real Nyquist filters only approximate this idealized passband characteristic 100. Further, the respective passbands of the Nyquist filters of different standard NTSC television receiver models differ slightly from one another. Therefore, it is desirable that relative unequal amplitudes of the respective frequencies of the lower and upper sidebands of the added constituent be adjusted at the transmitter so as to match to the greatest degree the actual passband characteristics of the greatest number of different model standard NTSC television receivers. The incorporation of the present invention in each of the several illustrative embodiments, discussed in detail below, makes it possible to achieve this desirable purpose.

Figure 2:
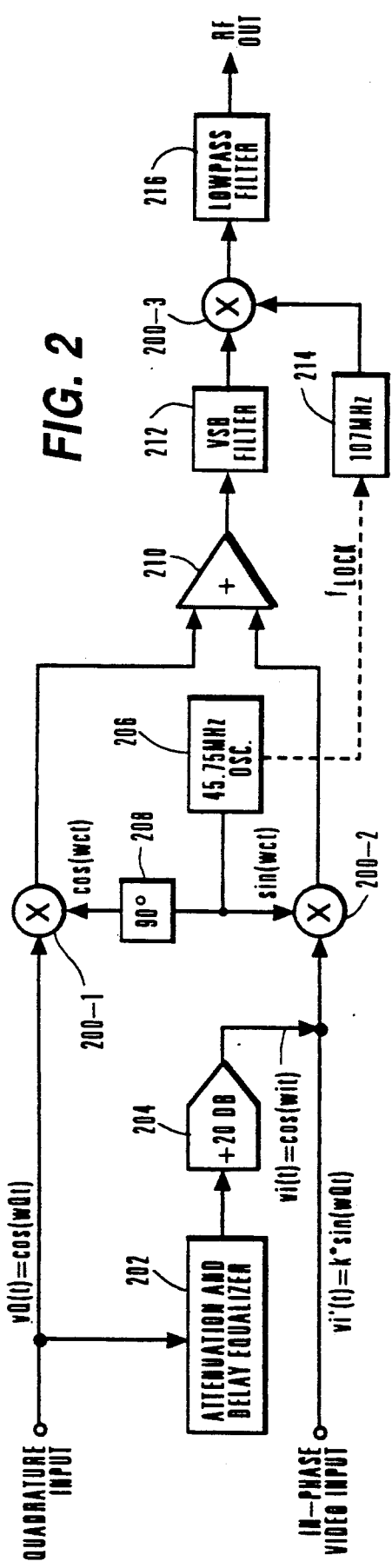
FIG. 2 is a block diagram of a first embodiment illustrating the principles of the present invention.

For illustrative purposes, it is assumed in FIG. 2 that extra-spectrum luma information, originally in the range of 4.5 MHz to 7.16 MHz that represents center and side-panel information for display on a wide screen television receiver, is to be inserted as an additional-information constituent of a transmitted NTSC television signal. In order to accommodate this luma information within the 6 MHz channel bandwidth allotted to a transmitted NTSC television signal, this extra-spectrum luma information is assumed to have been processed, frequency-shifted, and time expanded by a factor of four to move its signal energy approximately into the baseband region between 0.25 MHz and 0.75 MHz. This 0.25 MHz to 0.75 MHz baseband signal constitutes the extra-spectrum (ES) signal employed by the transmitter shown in FIG. 2.

Referring now to FIG. 2, there is shown the video-modulation deriving portion of a transmitter that incorporates a first embodiment of the present invention. The sound portion of the transmitter and the diplexer for combining the sound carrier and the derived video modulation sideband output with the in-phase picture carrier have been omitted in FIG. 2, since they are conventional and have nothing to do with the present invention.

Shown in FIG. 2 are three double-balanced mixers 200-1, 200-2 and 200-3. The 0.25 MHz and 0.75 MHz baseband signal constituting the extra-spectrum signal is applied as a quadrature modulating input vQ(t) to mixer 200-1, and, after passing through frequency-dependent attenuation and delay equalizer 202 and 20 db amplifier 204, is also applied as an in-phase additional signal modulating input vi'(t) to mixer 200-2. Further, a 0-4.2 MHz NTSC video baseband signal is applied as an in-phase modulating input vi(t) to mixer 200-2. A 45.75 MHz master oscillator synthesizer 206 applies an in-phase IF carrier signal to mixer 200-2 and, after passing through 90° phase shifter 208, applies a quadrature IF carrier signal to mixer 200-1. The respective outputs from mixers 200-1 and 200-2, after being combined by IF summing amplifier 210 and passing through IF vestigial sideband filter 212, are applied as a modulating input to mixer 200-3. The output from 107 MHz synthesizer 214, which is frequency-locked by synthesizer 206, is applied as a carrier frequency to mixer 200-3. The output from mixer 200-3, after passing through RF low-pass filter 216, constitutes the lower and upper video sidebands for the NTSC channel 3 transmitted signal, which has an in-phase picture carrier frequency of 61.25 MHz. These lower and upper video sidebands are then combined with the sound carrier, by means not shown in FIG. 2, before being transmitted to both wide screen and standard NTSC television receivers.

For simplicity in describing the operation of the embodiment shown in FIG. 2, it is assumed that both the quadrature carrier frequency vcQ(t) and each baseband frequency of the modulating quadrature input vQ(t) applied to mixer 200-1 have cosine waveforms; that the in-phase carrier frequency vci(t) applied to mixer 200-2 has a sine waveform, and that each baseband frequency of the modulating in-phase video input vi(t) applied to mixer 200-2 has a cosine waveform, as indicated in FIG. 2. However, it should be understood that the phase of any of the modulating inputs may be phase-shifted by any arbitrary phase angle $\phi$ without affecting the principles of operation of the present invention.

Further, the cosine waveform vQ(t) of each baseband frequency of the quadrature input, after being delayed and attenuated by frequency-dependent equalizer 202 and then being amplified by amplifier 204, is also applied as a modulating input to mixer 200-2. For purposes of discussion, assume for the moment that the frequency-dependent delay characteristic of equalizer 202 is such as to delay the cosine waveform vQ(t) of each baseband frequency by $\frac{3}{4}$ of a period thereof (i.e., 270°) and that insertion of any phase delay by amplifier 204 can be neglected. In this case the cosine waveform vQ(t) of each baseband frequency is converted to vi'(t), which has a sine waveform. The relative amplitude k of vi'(t) is a fraction having a value between 0 and 1 determined by the frequency-dependent attenuation characteristic of equalizer 202. Further, assume for the moment that the frequency-dependent attenuation characteristic of equalizer 202 is such that the value of k is proportional to frequency in the range between 0.25 MHz and 0.75 MHz, as shown by idealized attenuation factor k vs. baseband frequency characteristic 300 of FIG. 3. Based on the foregoing assumptions, the converted sine waveform vi'(t) of each baseband frequency f between 0.25 MHz and 0.75 MHz of the original quadrature input is applied as a second modulating input to mixer 200-2 with a relative amplitude k in accordance with characteristic 300, as indicated in FIG. 2.

A double-balanced mixer derives an output which is proportional in amplitude solely to the product of the respective amplitudes of its two inputs (the carrier frequency itself being suppressed in the mixer output). Therefore, mixer 200-1 derives an output VQ(t) proportional to $\cos(\omega Qt)*\cos(\omega ct)$, and mixer 200-2 derives an output that includes a first component Vi'(t) which is proportional to $-k*\sin(\omega Qt)*\sin(\omega ct)$ and a second component Vi(t) which is proportional to $\cos(\omega it)*\sin(107 ct)$. More specifically, in accordance with trigonometric identities, the respective outputs of mixers 200-1 and 200-2 shown in FIG. 2 are given by the following equations:

$$VQ(t) = (VQ*Vc/2)*[\cos(\omega c+\omega Q)t + \cos(\omega c-\omega Q)t] \quad (1)$$

$$Vi'(t) = k*(VQ*Vc/2)*[\cos(\omega c+\omega Q)t - \cos(\omega c-\omega Q)t] \quad (2)$$

$$Vi(t) = (Vi*Vc/2)*[\sin(\omega c+\omega Q)t + \sin(\omega c-\omega Q)t] \quad (3)$$

As shown in FIG. 2, the outputs of mixers 200-1 and 200-2 are added together in IF summing amplifier 210. Therefore, the output of amplifier 210, besides including equation 3, also includes the sum V'Q(t) of equations 1 and 2, which in somewhat simplified form is set forth in equation 4 below.

$$V'Q(t) = VQ*Vc*[(1+k)/2*\cos(\omega c+\omega Q)t + (1-k)/2*\cos(\omega c-\omega Q)t] \quad (4)$$

The output from IF summing amplifier 210 is passed through IF vestigial-sideband (VSB) filter 212 before being applied as a modulating signal to mixer 200-3. IF VSB filter 212, which has a passband that limits the upper sideband of the video signal (equation 3) to 1.25 MHz above the picture carrier while passing all of the 4.2 MHz lower sideband of the video signal, passes all of both the upper and lower sidebands of the additonal-information constituent (equation 4). Mixer 200-3 together with pw-pass filter 216 to frequency shift the output of IF VSB filter 212 to the RF of the television transmitter channel (assumed in FIG. 2 to be channel 3, which has a picture carrier frequency of 61.25 MHz). In passing through mixer 200-3 and low-pass filter 216, the IF upper and lower sidebands at the output of IF VSB filter 212 are reversed (i.e., produce mirror images) with respect to the picture carrier frequency at the RF output of low-pass filter 216. Thus at the RF output of low-pass filter 216 the sideband becomes the vestigial sideband and equation 4 is converted to the desired transmitted form shown in equation 5 below.

$$V'Q(t) = VQ*Vc*[(1+ke/2*\cos(\omega c-\omega Q)t + (1-k)/2*\cos(\omega c+\omega Q)t] \quad (5)$$

The reason for first operating at IF and then converting to RF, as shown in the embodiment of FIG. 2, is that it makes it possible to combine all three signals defined in equations 1, 2 and 3 before pasing them through the vestigial filtger, thereby mimizing differential gains and delays of the three signals in passing through the vestigial filter. However, it should be understood that equation 5 may be obtained directly by eliminating mixer 200-3 and employing the RF picture carrier frequency as the carrier frequency for mixers 200-1 and 200-2. In this latter case, it is necesary to substract equation 2 from equation 1 to derive equation 5. Alternatively, this may be accomplished by (1) inverting the in-phase carrier applied to mixer 200-2 (i.e., substituting $-\sin(\omega c)t$ for $\sin(\omega c)t$), (2) providing ahase delay of $\frac{1}{4}$ or 5/4 of a period (i.e., 90°) in attenuation and delay equalizer 202 for each frequency of additonal signal vi'(t), thereby modulating mixer 200-2 with a positive sine waveform rather than the sine waveform described above, or (3) inverting the output of mixer 200-2 applied as an input to summing amplifier 210 (thereby operating summing amplifier 210 as a subtracter). Further, in this latter case the output of mixer 200-2 only would be applied through an RF VSB filter operating on the lower sideband before the output of this RF VSB filter is combined with the output of mixer 200-1.

For purposes of teaching the principles of the present invention, the foregoing description of FIG. 2 does not take into consideration the differential delay and gain experienced by the two inputs to summing amplifier 210 in traveling different paths through mixers 200-1 and 200-2, respectively. However, in order for the output of summing amplifier 210 for each frequency of the IF upper and lower sidebands to conform to equation 4, it is essential that the two respective inputs thereto have exactly the correct relative phases and amplitudes with respect to one another. Therefore, a practical implementation of the embodiment shown in FIG. 2 includes appropriate means in at least one of the two paths to eliminate, or at least minimize, the aforesaid differential delay and gain. By way of example, delay means in one of the paths and delay and gain control means similar to the one disclosed in FIG. 7 below may be used for this purpose.

As pointed out above, the Nyquist filter passband of real standard NTSC television receivers only approximate the ideal passband shown in FIG. 1, and, further, slightly from one standard NTSC television receiver model to another. Therefore, in practice, the television signal transmitted from the FIG. 2 embodiment is supplied to a first model standard NTSC television receiver; the delay and attenuation characteristic values of delay and attenuation equalizer 202 are adjusted to minimize the interference in the picture displayed by this first model, and the adjustment values are recorded. This process is repeated for a large number of different models, and finally the delay and attenuation characteristic values of delay and attenuation equalizer 202 are set at those values which statistically match the recorded values of the most models with the least variance.

Figure 2A:
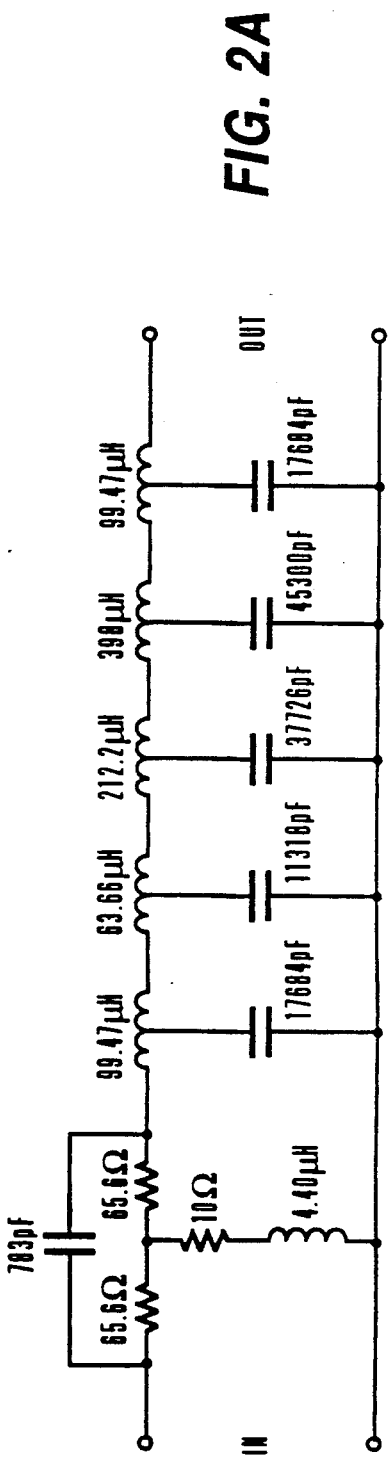
FIG. 2A is a schematic diagram of exemplary circuitry which may be implemented for the attenuation and delay equalizer 202 of FIG. 2.

FIG. 2A shows an exemplary embodiment of an analog realization of the attenuation and delay equalizer circuit 202. In this embodiment, the cascade connected inductors are Ferrite pot cores with 100 percent coupling between the two inductor halves, e.g. a total inductance of 99.47 microHenries is bifilar wound with each half being one half the total turns or 99.27/4 microHenries. Each stage of circuitry has a characteristic impedance of 75 Ohms.

Assume now that it is desired to transmit the extra-spectrum (ES) luma from 4.2-5.2 MHz of an extended-definition (E-D) 0-5.2 MHz video signal as an additional-information constituent of an NTSC television signal that can be received by both extended-definition and standard NTSC television receivers. This may be accomplished easily by the embodiment of the present invention shown in FIG. 4.

Figure 4:
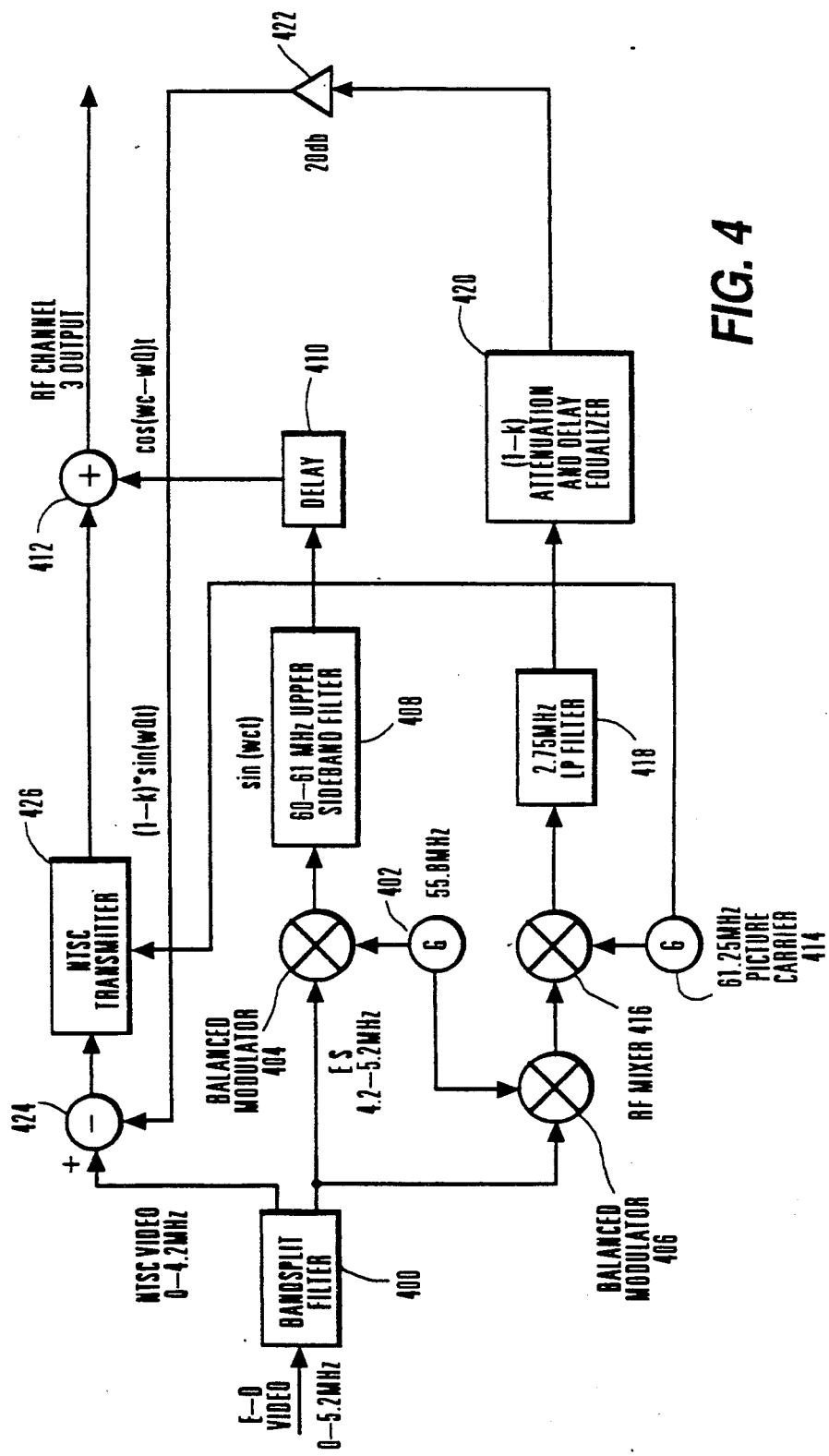
FIG. 4 is a block diagram of a second embodiment illustrating the principles of the present invention.

As shown in FIG. 4, an applied baseband 0-5.2 MHz E-D video signal is split by bandsplit filter 400 into a 0-4.2 MHz NTSC video signal and a 4.2-5.2 MHz ES signal. The 4.2-5.2 MHz ES signal modulates a 55.8 MHz secondary carrier from generator (G) 402 in both balanced modulators 404 and 406. Only the resulting 60-61 MHz upper sideband of the output from modulator 404 is passed by upper sideband filter 408 and applied through delay means 410 as a first input to adder 412. The lower and upper sidebands of the output from modulator 406 are beat against the 61.25 MHz channel 3 picture carrier frequency from generator 414 in RF mixer 416. The output from RF mixer 416 includes baseband frequencies in the band between 0.25-1.25 MHz, which after passing through low-pass filter 418, attenuation and delay equalizer 420, and 20 db amplifier 422, are applied as a first input to subtracter 424. The NTSC video signal from bandsplit filter 400 is applied as a second input to subtracter 424 and the output of subtracter 424 is applied as an input to channel 3 NTSC transmitter 426. The output from NTSC transmitter 426 is applied as a second input to adder 412 and the output from adder 412 constitutes the transmitted channel 3 output signal.

Figure 3:
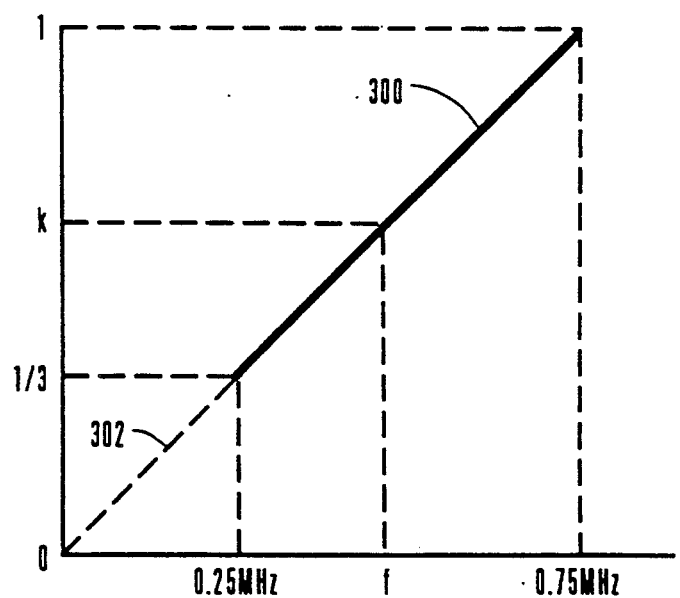
FIG. 3 graphically represents an idealized attenuation factor k vs. baseband frequency characteristic for a frequency-dependent attenuation equalizer employed by the embodiment of FIG. 2.

The attenuation vs. frequency characteristic of equalizer 420 of FIG. 4 is $(1-k)$, where the variation in the value of k with baseband frequency is assumed for illustrative purposes to conform to that shown in FIG. 3. Assume that the delay of equalizer 420 is set so that the phase of at least each baseband frequency in a band between 0.25-0.75 MHz of the 0.25-1.25 MHz baseband passing therethrough and forwarded as an input to NTSC transmitter 426 is shifted to a sine waveform having a relative amplitude $(1-k)$. Each such frequency modulates the sine waveform picture carrier of NTSC transmitter 426. Therefore, the NTSC transmitter output, VQ(t), excluding its standard NTSC signal, for that frequency is $$VQ(t) = -VQ^*Vc^*(1-k)^* \sin(\omega Qt)^* \sin(\omega ct) \qquad (6)$$

Since the picture carrier frequency is 61.25 MHz and the modulating-frequency band of 0.25-1.25 MHz, the upper and lower sideband frequencies of the NTSC transmitter output are 61.5-62.5 MHz and 60-61 MHz, respectively. Thus the lower sideband frequencies of the NTSC transmitter output are identical to the upper sideband frequencies of the output of modulator 404. Assume now that the delay introduced by delay means 410 both compensates for the signal delay through NTSC transmitter 426 and delivers each frequency of the output from upper sideband filter 408 to adder 412 with a relative amplitude of unity and with a cosine waveform (each frequency's relative amplitude is proportional to $\cos(\omega c - \omega Q)t$). Therefore, the output of adder 412, ignoring the NTSC signal, is $$V'Q(t) = VQ^*Vc^*[(\cos(\omega c - \omega Q)t) - (1-k)^* \sin(\omega Qt)^* \sin(\omega ct)] \qquad (7)$$

However, in accordance with a trigonometric identity, $$-\sin(\omega Qt)^* \sin(\omega ct) = -\tfrac{1}{2}^* \cos(\omega c - \omega Q)t + \tfrac{1}{2}^* \cos(\omega c + \omega Q)t \qquad (8)$$

Substituting equation 8 in equation 7 and simplifying, $$V'Q(t) = VQ^*Vc^*[(1+k)/2^* \cos(\omega c - \omega Q)t + (1-k)/2^* \cos(\omega c + \omega Q)t] \qquad (9)$$

Note that equation 9 is identical to equation 5.

Figure 5:
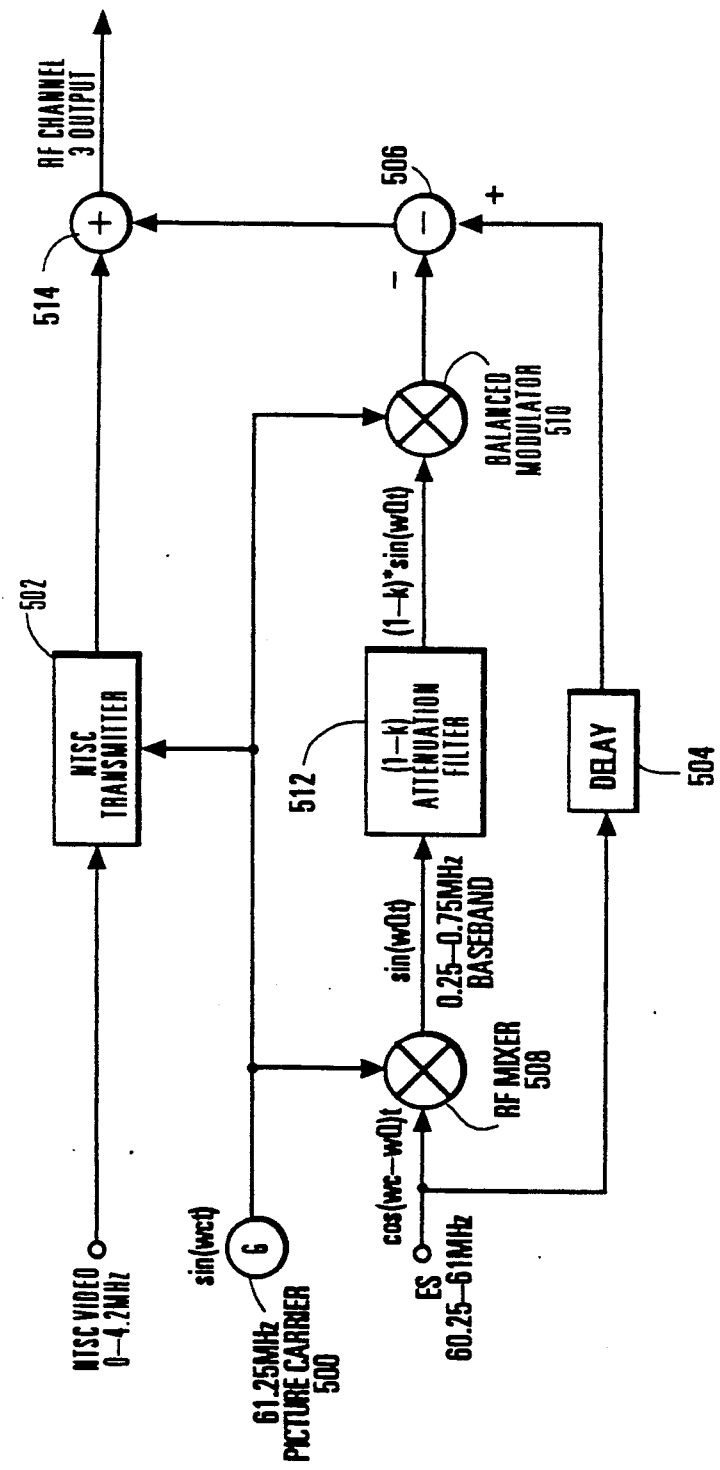
FIG. 5 is a block diagram of a third embodiment illustrating the principles of the present invention.

The embodiment of FIG. 5 is directed to the case in which the extra spectrum (ES) is initially available as the 60.25-61 MHz lower sideband of the 61.25 MHz picture-carrier generated by generator 500 and applied to NTSC transmitter 502, with each frequency of ES having a cosine waveform. A 0-4.2 MHz video signal is applied as an input to NTSC transmitter 502, while ES, after passing through delay means 504, is applied as a first input to subtracter 506. The sine waveform 61.25 MHz picture-carrier from generator 500, which is employed by NTSC transmitter 502, also is applied to RF mixer 508 and balanced modulator 510. The ES lower sideband is beat against the 61.25 MHz picture-carrier frequency in RF mixer 508 to derive a band of baseband frequencies from 0.25-0.75 MHz, each of which has a sine waveform. Each sine waveform frequency of this band of baseband frequencies, after passing through attenuation filter 512 having a $(1-k)$ attenuation characteristic, is applied as a modulating input to balanced modulator 510 with a relative amplitude of $(1-k)$. Therefore, each frequency of the lower and upper sidebands of the suppressed-carrier output from balanced modulator 510, which is applied as a second input to subtracter 506, conforms to above equations 6 and 8. Further, the output from subtracter 506 conforms to above equations 7 and 9. The output from subtracter 506 is then combined with the output from the NTSC transmitter 502 in adder 514 to derive the transmitted RF channel 3 output.

The only carrier employed by the FIG. 5 embodiment is the picture carrier. This distinguishes the FIG.

5 embodiment from the embodiments of FIGS. 2 and 4, which employ two separate carriers which differ from one another in either phase or frequency. In the embodiments of FIGS. 2 and 4, frequency-dependent delay means are needed for phase-shifting baseband frequencies to obtain the proper relative phase relationships of the lower and upper sidebands of each of the two combined components of the additional-information constituents. This phase-shifting delay is over and above the delay provided by delay means to compensate for the differential delay experienced by the two combined components because they traveled over different paths. In the case of the FIG. 5 embodiment, proper relative phase relationships of the lower and upper sidebands of each of the two combined components of the additional-information constituents is inherently obtained by trigonometric identities because the only carrier employed is the picture carrier. Thus, delay is only required to compensate for the differential delay experienced by the two combined components because they traveled over different paths.

Figure 6:
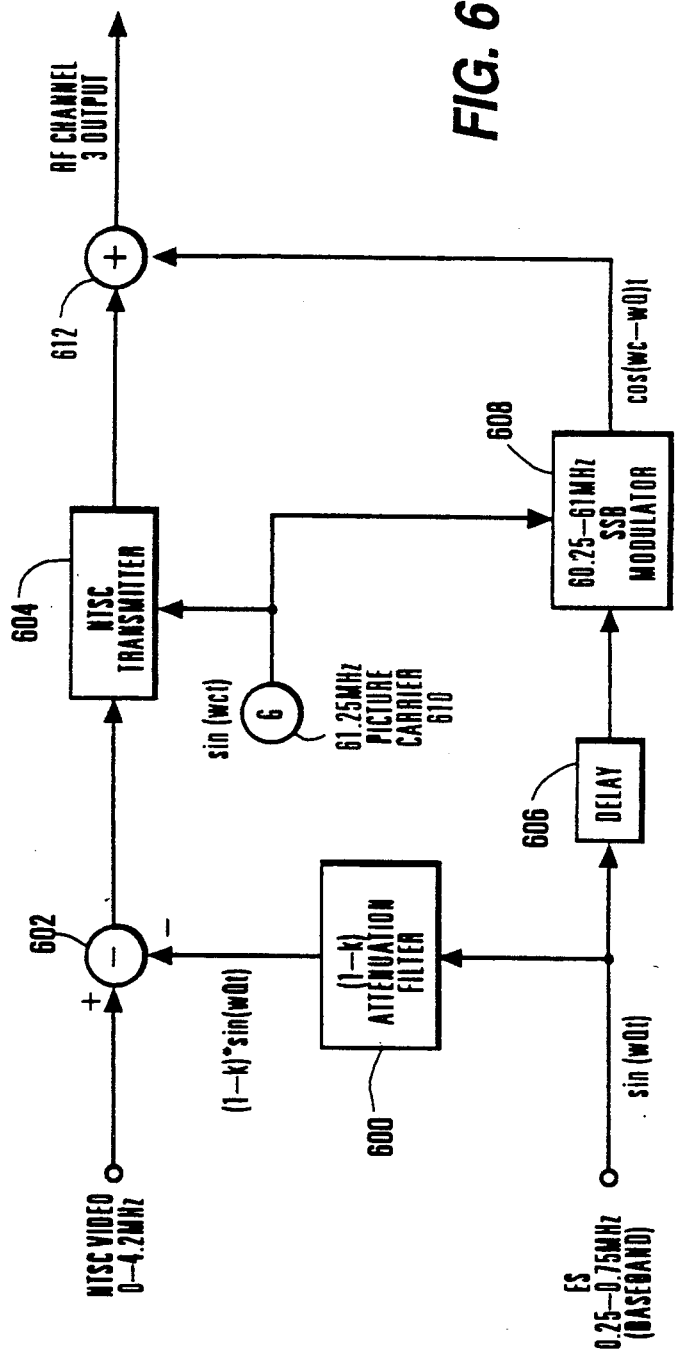
FIG. 6 is a block diagram of a fourth embodiment illustrating the principles of the present invention.

The FIG. 6 embodiment, like the FIG. 5 embodiment, employs only a 61.25 MHz picture carrier having a sine waveform. The extra spectrum (ES) in the FIG. 6 embodiment, however, is a band of baseband frequencies from 0.25–0.75 MHz, each of which frequencies also has a sine waveform. Each sine waveform frequency of the ES band of baseband frequencies, after passing through attenuation filter 600 having a $(1-k)$ attenuation characteristic, is combined with the 0–4.2 MHz NTSC video signal in subtracter 602 and applied as an input to NTSC transmitter 604. The ES band of baseband frequencies, after being delayed by delay means 606, is applied as a modulating input to single-sideband modulator (SSB) 608, which derives only a lower sideband. The 61.25 MHz picture carrier generated by generator 610, besides being applied to NTSC transmitter 604, is also applied to SSB 608, so that each of the 60.25–61 MHz frequencies of the lower sideband output from SSB 608 has a cosine waveform. This output from SSB 608, which is applied as a first input to adder 612, is combined with the output from NTSC transmitter 604, which is applied as a second input to adder 612, to derive the transmitted RF channel 3 output from adder 612. Each frequency of the band of baseband frequencies of the $(1-k)$ attenuated ES portion of the input to NTSC transmitter 604, will double-sideband modulate the picture carrier to derive lower and upper sidebands in the output of NTSC transmitter 604 which conform to above equations 6 and 8. Therefore, the transmitted RF channel 3 output from adder 612 includes an additional-information constituent which conforms to above equations 7 and 9.

Figure 7:
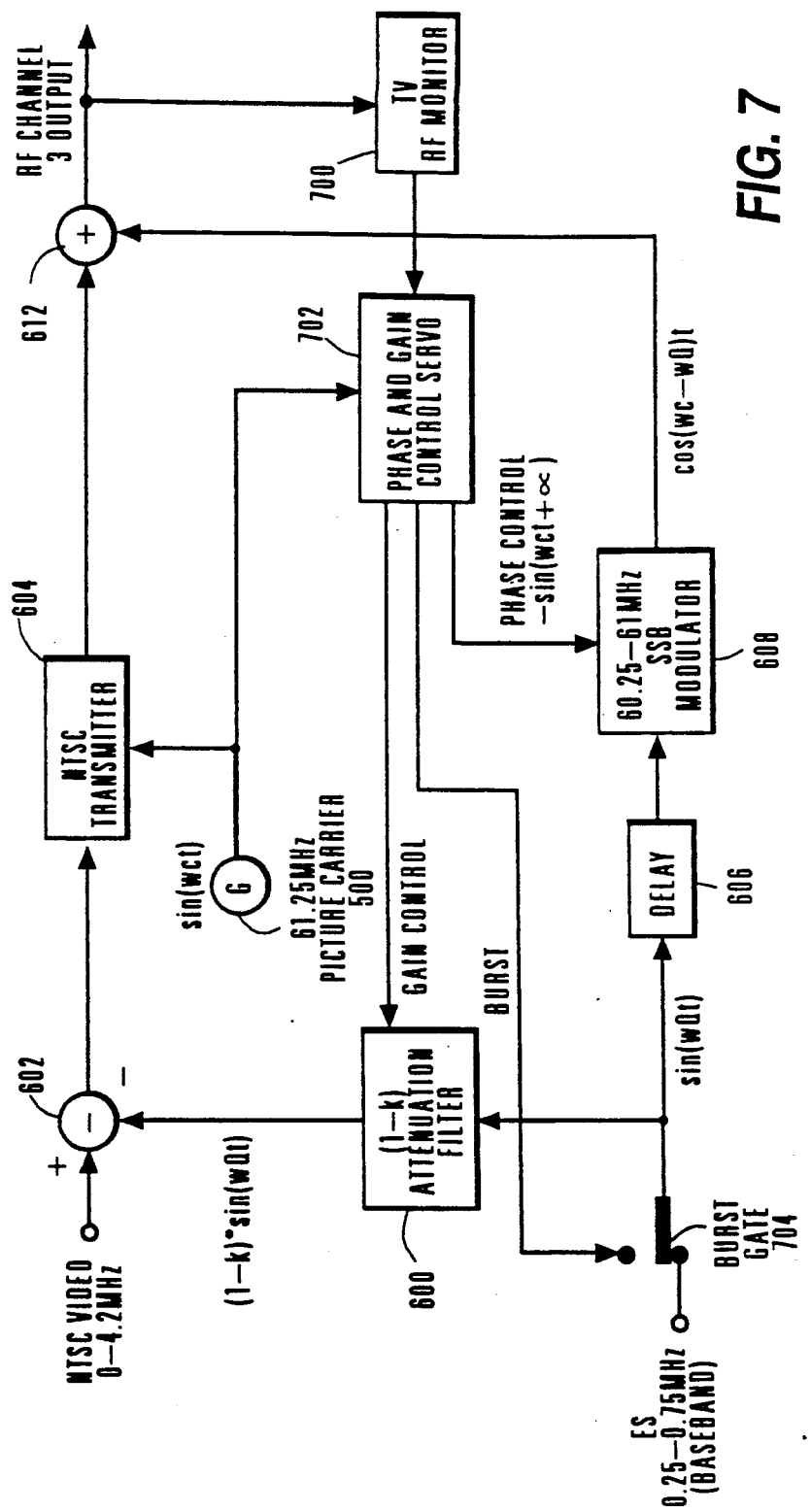
FIG. 7 shows servo means for compensating for differential delay and gain, applied as an example to the fourth embodiment of FIG. 6, which servo means is useful in practical implementations of the present invention.

In each of the four above-described illustrative embodiments of the present invention, the transmitted additional-information constituent is the vector difference of two different vector signals which have been derived over two separate signal paths and applied as inputs to a given vector combining means (i.e., a summing amplifier in FIG. 2 or subtracters in FIGS. 4, 5 and 6). In order that the correct vector difference be maintained at all times, it is desirable that negative feedback be employed to minimize differential delay and gain of the two separate signal paths with respect to one another. FIG. 7 shows servo means, applied as an example to the embodiment of FIG. 6, to provide such negative feedback. Specifically, included in FIG. 7 is television RF monitor 700 responsive to the transmitted RF channel 3 output for demodulating the RF channel 3 output, and then applying the baseband video output from monitor 700 as an input to phase and gain control servo means 702. The 61.25 MHz picture carrier from generator 610 is also applied as an input to phase and gain control servo means 702. Phase and gain control servo means 702 periodically (e.g., during the vertical blanking potion of each TV field) applies a predetermined-amplitude and predetermined phase test burst of a given frequency within the frequency band (preferably toward the middle of the band) of the applied ES signal to burst gate 704. In response thereto, burst gate 704 operates to momentarily substitute the test burst for the normally-applied ES signal. Phase and gain control servo means 702, which includes a narrow band filter for passing only the given frequency of the test burst in any interference signal that may be included in the video output from monitor 700, phase shifts the phase angle of the picture carrier by an angle $\alpha$ and derives a gain-control signal in accordance with the relative amplitude and phase of the test-burst in the interference-signal with respect to the predetermined amplitude and phase thereof. The gain-control signal, which is applied to attenuation filter 600, and the phase-shifted carrier $\sin(\omega c t + \alpha)$, which is applied to SSB modulator 608 tends to adjust the relative amplitudes and phases of the separate vector signals applied as inputs to adder 612 in that direction which reduces the energy of the interference signal.

In the case of the embodiment of FIG. 5, the phase-shifted carrier $\sin(\omega c t + \alpha)$ could be applied to balanced modulator 510, while the output of balanced modulator 510 could be applied as an input to subtracter 506 through a variable-gain amplifier (not shown) controlled by the gain-control signal. Although the embodiments of FIGS. 2 and 4 employ two carriers that differ from one another in frequency or phase and employ properly-adjusted frequency-dependent delay means to set the proper relative phases of the two separate summed vector signals, the negative-feedback principles used by servo means 702 can be still be employed by these embodiments to maintain the proper relationships after they have been initially set.

As can be seen from FIG. 1, when a transmitted additional-information constituent conforming to equations 5 and 9 is received by a standard NTSC receiver and passes through the Nyquist filter thereof, its lower sideband will be attenuated by a factor $(1-k)/2$ and its upper sideband will be attenuated by a factor $(1+k)/2$. Therefore, the signal reaching the synchronous detector of the receiver is proportional to $(1-k^2)/4*[\cos(\omega c - \omega Q)t + \cos(\omega c + \omega Q)t]$. However, $\cos(\omega c - \omega Q)t + \cos(\omega c + \omega Q)t$, in accordance with a trigonometric identity, is equal to an amplitude-modulated carrier frequency $\cos(\omega Q t)^* \cos(\omega c t)$, which is in quadrature with the phase of both the $\sin(\omega c)t$ picture-carrier frequency and the synchronous-detection carrier frequency, and so will not be detected.

For illustrative purposes, it has been assumed in all of the above-described FIGS. 2, 4, 5 and 6 embodiments that both the picture-carrier frequency and the baseband frequencies have sine waveforms. In accordance with this assumption, the trigonometric identities are such that the desired output shown in either of equations 4 or 9 are obtained by adding two cosine-waveform vector signals. However, if, in the embodiments of FIGS. 4, 5 and 6, both the picture-carrier frequency and the baseband frequencies were assumed to have cosine waveforms, the trigonometric identities would be such that V'Q(t) would be defined by equation 10 below, rather than by equation 9

$$V'Q(t) = VQ^*Vc^*[(1+k)/2^* \cos(\omega c - \omega Q)t - (1-k)/2^* \cos(\omega c + \omega Q)t] \quad (10)$$

In FIG. 2, equation 5 would be modified in a similar manner. Each frequency of an additional-information constituent conforming to equation 10 passed through the Nyquist filter of a standard NTSC receiver would be transformed into an amplitude-modulated carrier frequency $\sin(\omega Qt)^* \sin(\omega ct)$, which is in quadrature with the phase of both the $\cos(\omega c)t$ picture-carrier frequency and the synchronous-detection carrier frequency, and so will not be detected. Further, if one of the modulating frequency and picture-carrier frequency has a sine waveform and the other has a cosine waveform, the cosine waveforms of the lower and upper sidebands in equations 9 and 10 would be replaced by sine waveforms. However, after passing through the Nyquist filter of a standard NTSC receiver, the quadrature relationship with the phase of both the picture-carrier frequency and the synchronous-detection carrier frequency still will be maintained.

The only reason for limiting the lowest baseband frequency passed through the attenuation equalizer or filter to 0.25 MHz is to avoid the interference that would result in NTSC television receivers which employ intercarrier sound detection for lower baseband frequencies. However, this limitation is not essential to the present invention. Thus, the idealized characteristic shown in FIG. 3, if desired, may be extended all the way to a frequency of zero (i.e., DC), as indicated by dashed line 302.

It is known that greater precision and stability can be achieved with digital processing than with analog processing. Therefore, although the present invention may be implemented entirely with analog elements, it would be desirable to implement at least the baseband frequency portion with digital elements. In particular, it would be desirable to digitally implement the delay and attenuation equalizer employed in FIGS. 2 and 4 or the attenuation filter employed in FIGS. 5 and 6.

In the following claims, the expression "an in-phase carrier with respect to said picture carrier" is intended to include either an in-phase IF carrier, as employed in the FIG. 2 embodiment, or the RF picture carrier itself, as employed in the FIGS. 4, 5, 6 and 7 embodiments.

What is claimed is:

1. Apparatus for encoding a television signal, including in-phase and quadrature-phase modulated carriers, for reception by a receiver having a filter transfer function tending to cause introduction of interference in the image represented by said television signal in response to reception of the quadrature-phase modulated carrier, said apparatus comprising:
respective sources of first and second signals;
a source of carrier signal;
means responsive to said first signal and said carrier signal for providing a first amplitude modulated carrier signal of first carrier phase, modulated with said first signal;
means, having a frequency dependent phase and attenuation characteristic and responsive to said first signal, for generating a compensating signal;
means, responsive to said compensating signal and said carrier signal, for providing a second amplitude modulated carrier signal of second carrier phase substantially in quadrature with said first carrier phase and modulated with said compensating signal;
means, responsive to said second signal and said carrier signal, for providing a third amplitude modulated carrier signal of said second carrier phase, and modulated with said second signal; and
means for providing a transmission signal including said first amplitude modulated signal, said second amplitude modulated signal and said third amplitude modulated signal.

2. The apparatus set forth in claim 1 wherein said means having a frequency dependent phase and attenuation characteristic comprises a frequency-dependent delay and attenuation equalizer for phase shifting the phase of each frequency of said first signal by a given amount and for multiplying the amplitude of that frequency by a factor k that varies in value in accordance with said frequency dependent attenuation characteristic from zero for a frequency of zero to unity for a predetermined frequency.

3. The apparatus set forth in claim 1 wherein said means for providing said second and third amplitude modulated carrier signals comprise;
signal combining means having first and second input terminals coupled respectively to said means for generating a compensating signal and said source of second signal, for providing a combined signal; and
means responsive to said combined signal for modulating said carrier signal.

4. Apparatus for encoding a television signal, including an in-phase carrier modulated with composite video signal and a quadrature-phase carrier modulated with an auxiliary signal for reception by a receiver having a filter transfer function tending to cause introduction of interference in the image represented by said television signal in response to reception of the quadrature-phase modulated carrier, said encoding apparatus comprising:
respective sources of baseband composite video signal, baseband auxiliary signal, and a carrier signal;
means, responsive to said baseband auxiliary signal, for generating a baseband compensating signal for substantially preventing said interference;
means for combining said baseband compensating signal and said baseband composite video signal, to produce a combined signal;
means responsive to said combined signal and said carrier, for providing a first amplitude modulated carrier of first carrier phase;
means, responsive to said baseband auxiliary signal, and said carrier signal for providing a second amplitude modulated carrier of carrier phase substantially in quadrature with said first carrier phase; and
means for combining said first and second amplitude modulated carriers.

5. Apparatus for encoding a television signal, including an in-phase carrier modulated with composite video signal and a quadrature-phase carrier modulated with an auxiliary signal for reception by a receiver having a filter transfer function tending to cause introduction of interference in the image represented by said television signal in response to reception of the quadrature-phase modulated carrier, said encoding apparatus comprising:
respective sources of baseband composite video signal, baseband auxiliary signal, and a carrier signal;

means, responsive to said baseband composite video signal, said baseband auxiliary signal, and said carrier signal, for providing said in-phase and quadrature-phase modulated signal constituents; and means operative on said baseband auxiliary signal for generating a further signal constituent, and adding such further constituent to said television signal, said further constituent substantially preventing said interference in said receiver due to said filter transfer function.

6. In an extra-spectrum, compatible television system transmitter for transmitting a picture carrier having a given frequency and given phase that is modulated both by an NTSC television signal and by an additional-information constituent for reception by both extra-spectrum television receivers and by standard NTSC receivers, wherein said extra-spectrum television receivers make use of both said NTSC television signal and said additional-information constituent, wherein said standard NTSC receivers make use of only said NTSC television signal, and wherein said standard NTSC receivers includes a Nyquist filter that tends to introduce interference into the picture displayed by that standard NTSC receiver in response to the reception thereby of said additional-information constituent; said transmitter comprising first means for deriving said additional-information constituent modulating said picture carrier from an extra-spectrum signal that includes the additional information of said constituent at least as a component thereof; the improvement wherein said first means comprises:

second means responsive to said extra-spectrum signal being applied thereto, said second means including a frequency-dependent baseband attenuation means for deriving as an output therefrom a baseband additional signal defining said additional information that includes a given band of baseband frequencies, said attenuation means having a predetermined frequency-dependent attenuating characteristic for each frequency of said given band, whereby the relative amplitudes of said given band of frequencies are attenuated with respect to the corresponding amplitudes of said additional-information component of said extra-spectrum signal in accordance with said predetermined frequency-dependent attenuating characteristic;

third means for double-sideband modulating an in-phase carrier with respect to said picture carrier with said first additional signal to derive lower and upper first sideband frequencies with respect to said in-phase carrier frequency, each of which first sideband frequencies has a first certain phase and a relative amplitude in accordance with said predetermined frequency-dependent attenuating characteristic;

fourth means responsive to said extra-spectrum signal being applied thereto for deriving second sideband frequencies which correspond to at least those of one of said lower and upper first sidebands, each of said second sideband frequencies having a second certain phase relative to said first certain phase and having a relative amplitude that is independent of said predetermined frequency-dependent attenuating characteristic; and fifth means for deriving said additional-information constituent modulating said picture carrier from a given vector combination of each of said second sideband frequencies and the lower and upper first sideband frequency with which it corresponds, wherein both (1) said predetermined frequency-dependent attenuating characteristic and (2) said second certain phase of each of said respective second sideband frequencies relative to said first certain phase of its corresponding lower and upper first sideband frequency are such that each of the frequencies of said additional-information constituent received by a standard NTSC receiver will, after passing through the Nyquist filter thereof, be transformed into an amplitude-modulated carrier frequency which is substantially in quadrature with the phase of both said picture carrier and a synchronous-detection frequency of said receiver.

7. The transmitter defined in claim 6, wherein said extra-spectrum signal is a video signal including said given band of baseband frequencies, and wherein:

said fourth means includes sixth means for double-sideband modulating a quadrature carrier with respect to said in-phase carrier with said extra-spectrum video signal to derive second sideband frequencies which correspond to both said lower and upper first sidebands; and said attenuation means for deriving said additional signal comprises a frequency-dependent delay and attenuation equalizer for phase shifting the phase of each frequency of said given band of said extra-spectrum video signal by a given amount and for multiplying the amplitude of that frequency by a factor k that varies in value in accordance with said predetermined frequency-dependent attenuating characteristic from zero for a frequency of zero to unity for a predetermined frequency, whereby each of said first sideband frequencies has a relative amplitude in accordance with the value of k/2 and a first certain phase in accordance with said given amount of phase shift, said given amount of phase shift being such that each frequency of a certain one of the lower and upper first sidebands and second sidebands have substantially the same phases as one another and the other one of the lower and upper first sidebands and second sidebands have substantially opposite phases as one another;

whereby the relative amplitude of the vector combination of each frequency of said certain one of the lower and upper first sidebands and second sidebands is substantially $(1+k)/2$ and the relative amplitude of the vector combination of each frequency of said other one of the lower and upper first sidebands and second sidebands is substantially $(1-k)/2$.

8. The transmitter defined in claim 7, wherein said in-phase and said quadrature carriers are IF carrier frequencies, and wherein:

said third means is responsive to an NTSC video signal applied thereto for also double-sideband modulating said in-phase carrier with said NTSC video signal; and said fifth means includes IF summing means for vector-combining said first and second sidebands to provide an output therefrom in which each frequency of the upper sideband thereof has a relative amplitude of $(1+k)/2$ and each frequency of the lower sideband thereof has a relative amplitude of $(1-k)/2$, IF NTSC vestigial filter means responsive to the output from said IF summing means for rejecting upper-sideband frequencies that differ by more than 1.25 MHz from the IF carrier frequency, and picture-carrier frequency-shifting means including a mixer responsive to the output from said vestigial filter means for deriving said additional-information constituent as an output therefrom comprised of a lower sideband of said picture carrier in which each frequency thereof has a relative amplitude of substantially $(1+k)/2$ and an upper sideband of said picture carrier in which each frequency thereof has a relative amplitude of substantially $(1-k)/2$.

9. The transmitter defined in claim 7, wherein the lowest frequency of said extra-spectrum video signal is of the order of 0.25 MHz.

10. The transmitter defined in claim 6, wherein said extra-spectrum signal is comprised of an extended-definition video signal band having a lowest frequency no less than 4.2 MHz and a bandwidth no greater than 1.25 MHz:

said second means includes sixth means for modulating a secondary carrier frequency with said extended-definition video signal band, said secondary carrier frequency being displaced below the picture carrier frequency by a predetermined amount such that the upper sideband of said secondary carrier frequency occupies a frequency interval between said picture carrier frequency and a frequency no greater than 1.25 MHz below said picture carrier frequency, and an RF mixer for beating said upper sideband of said secondary carrier against said picture carrier to derive an output therefrom that includes said given band of baseband frequencies;

said attenuation means for deriving said additional signal comprises a frequency-dependent delay and attenuation equalizer for phase shifting the phase of each baseband frequency of said given band by a given amount and for multiplying the amplitude of that frequency by a factor $(1-k)$, in which k varies in value in accordance with said predetermined frequency-dependent attenuating characteristic from zero for a frequency of zero to unity for a frequency of 0.75 MHz;

said third means is comprised of an NTSC transmitter having both said additional signal and an NTSC video signal applied as inputs thereto for deriving said first sideband frequencies as part of the output thereof, whereby the frequencies of the lower first sideband correspond to the frequencies of said upper sideband of said secondary carrier frequency and said first certain phase of each of said first sideband frequencies is in accordance with said given amount of phase shift and has a relative amplitude of $(1-k)/2$;

said fourth means includes seventh means for deriving, as an output, each frequency of said upper sideband of said secondary carrier frequency with said second certain phase and a relative amplitude of unity; and said fifth means comprises vector-combining means for vector-combining the outputs of said seventh means and said NTSC transmitter, with said given amount of phase shift of each baseband frequency of said given band being set such that said first and second certain phases of each of the respective vector-combined frequencies of the lower first sideband and the lower second sideband are substantially opposite in phase from one another, whereby the relative amplitude of each frequency of the lower sideband of said additional-information constituent is substantially $(1+k)/2$ and the relative amplitude of each frequency of the upper sideband of said additional-information constituent is substantially $(1-k)/2$.

11. The transmitter defined in claim 10, wherein the highest frequency of said upper sideband of said secondary carrier is of the order of 0.25 MHz below the picture carrier frequency.

12. The transmitter defined in claim 6, wherein said extra-spectrum signal is comprised of the lower sideband of said picture carrier modulated by additional information that includes said given band of baseband frequencies, and wherein:

said second means comprises an RF mixer for beating said upper sideband of said secondary carrier against said picture carrier to derive an output therefrom that includes said given band of baseband frequencies;

said attenuation means for deriving said additional signal comprises a frequency-dependent delay and attenuation equalizer for phase shifting the phase of each baseband frequency of said given band by a given amount and for multiplying the amplitude of that frequency by a factor $(1-k)$, in which k varies in value in accordance with said predetermined frequency-dependent attenuating characteristic from zero for a frequency of zero to unity for a frequency of 0.75 MHz;

said third means is comprised of a balanced modulator for double-sideband modulating said picture carrier with said additional signal to derive each of said first sideband frequencies as the output thereof that is forwarded to said fifth means with said first certain phase and a relative amplitude of $(1-k)/2$;

said fourth means includes sixth means for forwarding each frequency of said lower sideband of said picture carrier comprising said extra spectrum signal to said fifth means with said second certain phase and a relative amplitude of unity, said sixth means including delay means for substantially compensating for differential delay introduced by said second and third means in said first sideband frequencies forwarded to said fifth means said fifth means comprises vector subtraction means for subtracting each of said first sideband frequencies forwarded thereto from each of said second sideband frequencies forwarded thereto, whereby the relative amplitude of each frequency of the lower sideband of said additional-information constituent is substantially $(1+k)/2$ and the relative amplitude of each frequency of the upper sideband of said additional-information constituent is substantially $(1-k)/2$.

13. The transmitter defined in claim 12, further comprising:

an NTSC transmitter having an NTSC video signal applied as an input thereto; and means for adding the output of said vector subtraction means to the output from said NTSC transmitter.

14. The transmitter defined in claim 12, wherein the closest frequency of said lower-sideband extra spectrum signal to said picture carrier frequency is of the order of 0.25 MHz below the picture carrier frequency.

15. The transmitter defined in claim 6, wherein said extra-spectrum signal is a video signal including said given band of baseband frequencies, and wherein:

said attenuation means for deriving said additional signal comprises a frequency-dependent delay and attenuation equalizer for phase shifting the phase of each baseband frequency of said given band by a given amount and for multiplying the amplitude of that frequency by a factor $(1-k)$, in which k varies in value in accordance with said predetermined frequency-dependent attenuating characteristic from zero for a frequency of zero to unity for a frequency of 0.75 MHz;

said third means is comprised of subtraction means for subtracting said additional signal from an NTSC video signal, and an NTSC transmitter having the output of said subtraction means applied as an input thereto for deriving said first sideband frequencies as part of the output of said NTSC transmitter which is forwarded to said fifth means, whereby each of the frequencies of said forwarded first sideband has said first certain phase and a relative amplitude of $(1-k)/2$;

said fourth means includes a single sideband modulator for modulating said picture carrier freqency with said given band of baseband frequencies to derive as an output therefrom solely lower-sideband frequencies with respect to said picture carrier frequency, and sixth means for forwarding as said second sideband each frequency of said lower sideband output of said single sideband modulator to said fifth means with said second certain phase and a relative amplitude of unity, said sixth means including delay means for substantially compensating for differential delay introduced by said second and third means in said first sideband frequencies forwarded to said fifth means, whereby said first certain phase is inverted with respect to said second certain phase; and said fifth means is comprised of adder means for adding the output of said sixth means to the output of said NTSC transmitter, whereby the relative amplitude of each frequency of the lower sideband of said additional-information constituent is substantially $(1-k)/2$ and the relative amplitude of each frequency of the upper sideband of said additional-information constituent is substantially $(1-k)/2$.

16. The transmitter defined in claim 15, wherein the lowest frequency of said extra-spectrum video signal is of the order of 0.25 MHz.

17. The transmitter defined in claim 6, further comprising:

phase and gain control means for substituting a burst of a predetermined frequency within the bandwidth of said extra spectrum signal input to said second and fourth means for said extra spectrum signal input thereto, said phase and gain control means being responsive to the level of an interference signal due to said burst in the output of an NTSC RF television monitor that receives the transmission of said transmitter for phase shifting the phase of the picture carrier frequency and varying the relative gain of the path through said second and third means with respect to the gain of the path through said fourth means in those respective directions that results in the reduction of the level of said interference signal.

* * * * *